United States Patent [19]
Thirion de Briel et al.

[11] Patent Number: 5,522,490
[45] Date of Patent: *Jun. 4, 1996

[54] LINER SUPPORT DISC FOR SUPPORTING FRICTION LINERS, ESPECIALLY FOR A MOTOR VEHICLE

[75] Inventors: Jacques Thirion de Briel, Colombes; André Dalbiez, Argenteuil, both of France; Gino Villata, Buttigliera D' Asti, Italy; Michel Blard, Issy-Les-Moulineaux, France

[73] Assignee: Valeo, Paris, France

[*] Notice: The term of this patent shall not extend beyond the expiration date of Pat. No. 5,452,783.

[21] Appl. No.: 335,890

[22] PCT Filed: Mar. 18, 1994

[86] PCT No.: PCT/FR94/00297

§ 371 Date: Nov. 17, 1994

§ 102(e) Date: Nov. 17, 1994

[87] PCT Pub. No.: WO94/21934

PCT Pub. Date: Sep. 29, 1994

[30] Foreign Application Priority Data

Mar. 19, 1993 [FR] France ................................. 93 03193
Jun. 21, 1993 [FR] France ................................. 93 07475
Jul. 15, 1993 [EP] European Pat. Off. ............. 93401832
Nov. 9, 1993 [FR] France ................................. 93 13341

[51] Int. Cl.$^6$ ............................................. F16D 13/64
[52] U.S. Cl. ................................. 192/107 C; 192/52.6
[58] Field of Search ....................... 192/107 C, 52, 192/52.6

[56] References Cited

U.S. PATENT DOCUMENTS

| | | | |
|---|---|---|---|
| 2,566,394 | 9/1951 | Zeidler | 192/107 C |
| 2,902,130 | 9/1959 | Halberg et al. | 192/105 |
| 4,108,699 | 8/1978 | de Gennes | 156/92 |
| 5,014,842 | 5/1991 | Graton et al. | 192/106.2 |

FOREIGN PATENT DOCUMENTS

| | | | |
|---|---|---|---|
| 0579554 | 1/1994 | European Pat. Off. | |
| 768143 | 7/1934 | France | |
| 794147 | 2/1936 | France | |
| 2692635 | 12/1993 | France | |
| 2751043 | 5/1978 | Germany | 192/107 C |
| 459006 | 12/1936 | United Kingdom | 192/107 C |
| 1465913 | 3/1977 | United Kingdom | |

*Primary Examiner*—Richard M. Lorence
*Assistant Examiner*—Saul Rodriguez
*Attorney, Agent, or Firm*—Longacre & White

[57] ABSTRACT

In the liner support disc adapted to constitute a clutch friction wheel, especially for a motor vehicle, of the kind comprising a central portion (16) and a peripheral portion divided into radial blades (672) alternating in the circumferential direction with a series of radial tongues (671) in the same plane as the central portion (16) of the liner support disc, in which the blades (672) have, joined by bent portions (421), a central support zone (423) and two peripheral support zones (422) on either side of the zone (423), the peripheral zones (422) being offset axially with respect to the central zone (423), at least some of the tongues (671) have at least one support zone (622) offset axially towards the central zone of the blades (672) by virtue of a connecting bent portion (621).

11 Claims, 4 Drawing Sheets

LINER SUPPORT DISC FOR SUPPORTING FRICTION LINERS, ESPECIALLY FOR A MOTOR VEHICLE

The present invention relates to a liner support disc for supporting friction liners, adapted to constitute a clutch friction wheel, especially for a motor vehicle, of the kind comprising a central portion and a peripheral portion divided into radial blades for receiving the friction liners, with each of the said blades being joined integrally to the said central portion through a foot, and comprising at least one support zone which is generally parallel to the mean plane of the said central portion, for contact with at least one of the said friction liners and for fastening of the latter. In a clutch friction wheel, the said liners lie on either side of the peripheral portion.

Clutch friction wheels are sometimes subject in operation to disagreeable vibrations constituting what is often called judder. This judder is just as likely to occur at low torques, during a parking manoeuvre, as at high torques during a gear change when travelling.

The support zones are sometimes not as large as desired, which gives rise to an embedding effect in which the friction liners become embedded in the hollows that exist between two support surfaces of the same blade. This gives rise to a lack of flexibility, which is at least partly responsible for judder effects at maximum load.

In addition, there is a problem of contact with, in particular, the pressure plate of the clutch.

In this connection, in a clutch, each time the clutch is engaged, the friction liners become progressively gripped between a pressure plate and a reaction plate.

The heating which is caused by the friction leads inevitably to deformation of the pressure plate into a conical form as is explained for example in the document U.S. Pat. No. 2,902,130, and the same is true, though to a lesser extent, for the reaction plate. As a result, the zone in which the friction liners are subjected to the pressure from one or other of these plates becomes progressively offset towards the axis of the assembly, with consequent unequal wear of the said friction liners and a reduction in their efficiency (i.e. reduced torque transmission), and even the occurrence of judder effect.

In order to overcome these drawbacks and to resolve this problem, it has been proposed in the document EP-A-0 579 554 to provide blades of the tripod type which have a central support zone and two peripheral support zones on either side of the said central zone.

The central zone is offset axially with respect to the peripheral support zones, and with respect to the central portion.

In one embodiment, the said blades are in circumferential alternation with a series of tongues.

The tripod blades serve for the fastening, in their central zone, of one of the friction liners, in this case the one which is associated with the pressure plate of the clutch, while the tongues serve for the fastening of the other friction liner, in this case the one that is associated with the reaction plate of the clutch.

By virtue of this arrangement, the tongues have sufficient elasticity to follow the tendency of the reaction plate to adopt a conical form, with the tripod blades following the tendency of the pressure plate to adopt a conical form and having a large circumferential length with large contact surfaces.

In addition, the embedding and judder effects are reduced, and the blades are able to rotate at higher speeds.

When the friction liners are progressively and elastically gripped between the pressure and reaction plates, the friction liner, which may be of divided form and which is associated with the pressure plate, is well supported because there is a reaction force on the other friction liner via its peripheral support zones.

The same is not true for the other friction liner, which may be of divided form and which is carried by the tongues. As a result, those zones of the liner that face the tongues wear less slowly, the result of which is wear of the liner that is not well distributed.

An object of the present invention is to overcome these drawbacks.

According to the invention, a liner support disc of the type defined above is characterised in that at least some of the said tongues have at least one support zone offset axially towards the central zone of the blades by virtue of a connecting bent portion.

By virtue of the invention, during the elastic compression of the friction liners, the friction liner associated with the tongues undergoes a reaction force due to the new support zone, defining a stabilising zone, which is adapted to engage against the other friction liner.

Embedding effects are thus reduced, since wear in the liner on the tongues is better distributed.

In addition, the wear effects in the liner associated with the blades are reduced because the support zone of the tongues provides an additional support. For the other liner, wear is more regular. The supplementary support zone may be arranged at the level of the free end of the tongue, that is to say at the outer periphery of the latter.

In a modification, it may be formed radially further inwardly, by virtue of a slot, the zone being then directed inwardly or outwardly.

It is of course possible to provide two supplementary support zones, one at the free end of the tongue and the other further inwards.

In a modification, the tongue may be a mirror image of the tripod blade and may have two supplementary peripheral support zones. By virtue of all these arrangements it is possible, due to the supplementary support in accordance with the invention, to employ a method of securing the friction liners adhesively on at least some of the tripod blades.

Preferably, the friction liners concerned are then secured directly by adhesion alone on all the central zones of the said blades.

Thus it is possible to reduce even more the inertia of the liner support disc, and the latter is able to rotate at even higher speeds when utilized in a higher rotating clutch mechanism without incurring the drawbacks of the prior art.

In this connection, the friction liner concerned has just its useful thickness, because there is no need to provide any increased thickness as in the case where riveting is used. In addition, the rivet holes are reduced, which increases the strength of the clutch friction wheel and reduces the chances of fracture.

As described in the document EP-A-0 579 554, it is of course possible to increase the length of the central zone of the tripod blade radially inwardly by virtue of a slot in the longitudinal bent portion, which enables the support and fastening zone offered to the liner to be enlarged even more. The other liner can be secured to the radial tongues by riveting, but for further reduction of the inertia of the friction wheel, the other friction liner can of course be secured adhesively on the said tongues.

The opposite is also possible, with one of the liners being secured by riveting on the tripod blades and the other liner being secured on the said tongues adhesively. All combinations are possible.

If desired, due to the extension in length of at least some of the central zones of the tripod blades in the manner mentioned above, it is possible to secure the friction liner by means of two rows of rivets, one of which is fastened in the said extension as described in the above mentioned document EP-A-0 579 554. It is also possible to arrange two rows of rivets in the tongues.

It is also possible, for improved stability, to provide supplementary support zones in the tripod blade, either in its peripheral zones or in its central zone, especially when the liner concerned is secured adhesively, since in that case the rivet holes are omitted, which facilitates the location of the said supplementary support zones and renders bonding more secure while reducing the occurrence of peeling.

According to another feature, the tongues have a free end of reduced circumferential width carrying the supplementary support zone. This enables the supplementary support zones of the tongues to be given good flexibility, with the possibility of increasing the circumferential width of the peripheral support zones of the tripod blades.

According to a further feature, the tongues are tapered towards their outer periphery, so that the root zone by which they are joined to the central portion of the liner support disc is enlarged, which increases the robustness of the said disc. This also enables the stiffness of the supplementary support zone of the tongue to be reduced.

The following description illustrates the invention with reference to the attached drawings, in which.

The drawings show a liner support disc which is adapted to form part of a clutch friction wheel for a motor vehicle.

This friction wheel comprises a central portion 16 and, integral with it, a peripheral portion which is divided into radial blades 672 which are arranged alternately in the circumferential direction, being in this example at regular intervals, with a series of radial tongues 671 in the plane of the central portion 16 of the liner support disc.

As is described in the Application EP-A-0 579 554, each blade is joined to the central portion 16 through a longitudinal foot 480, and has a central support zone 423 and two peripheral support zones 422.

The central zone 423 is offset axially with respect to the central portion and with respect to the peripheral support zones, in this example in the plane of the said central portion.

Figures 1, 2, 3, 4:
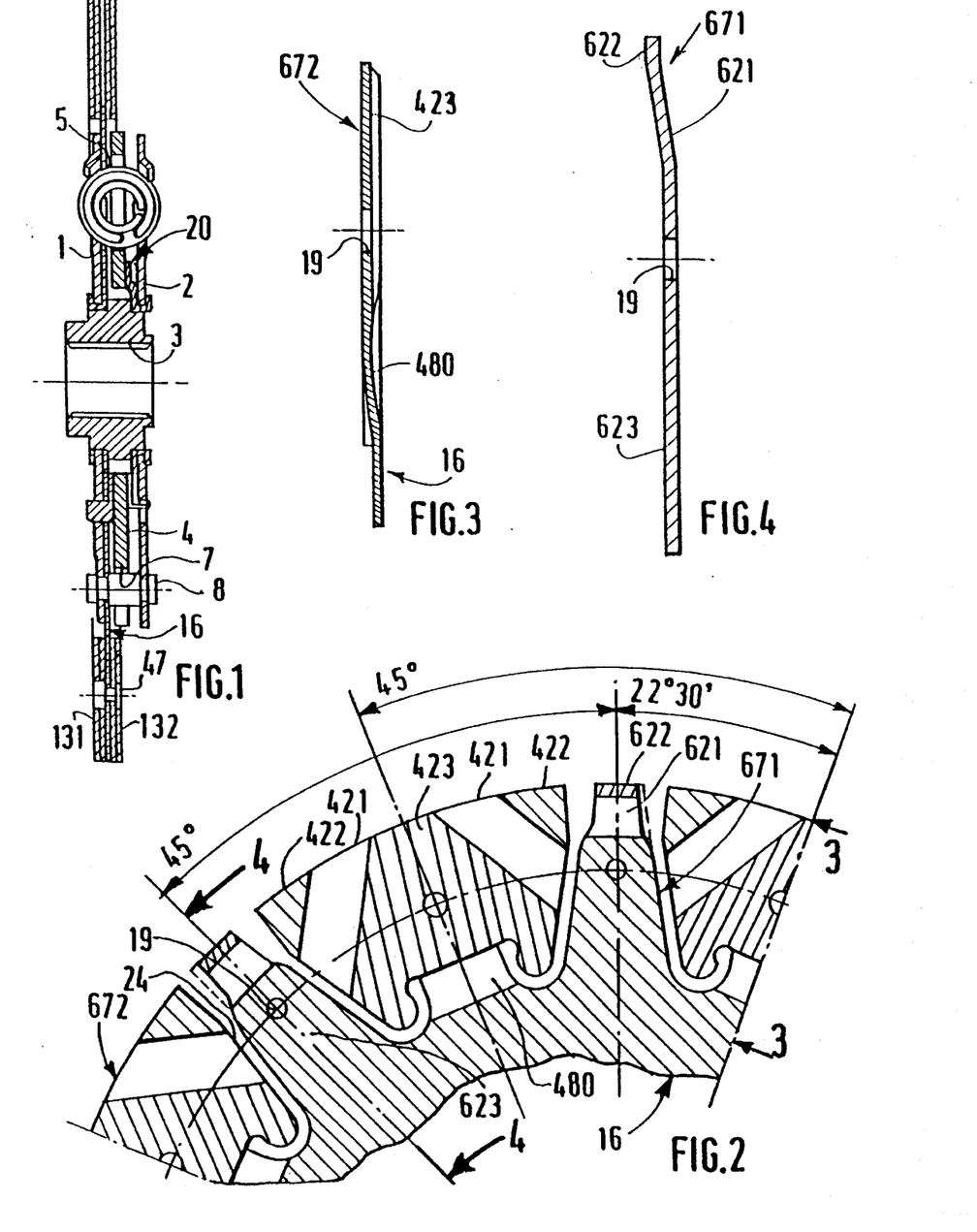
FIG. 1 is a view in axial cross section of a clutch friction wheel equipped with a liner support disc in accordance with the invention.
FIG. 2 is a partial view in elevation of the said liner support disc, with the support zones shown cross hatched.
FIG. 3 is a view in cross section on a larger scale, taken on the line 3—3 in FIG. 2.
FIG. 4 is a view on a larger scale, in cross section taken on the line 4—4 in FIG. 2.

The central zone 423, which is large, serves for the fastening of a friction liner 132, while the tongues 672 serve for the fastening of a further friction liner 131. To this end, the tongues 671 and the central zones 423 of the blades 672 are formed in this example with holes 19 spaced apart on a common pitch circle, for the fastening of the said liners 131, 132 to the liner support disc, in this example by means of rivets 47 (FIG. 1).

In a modification, the holes 19 do not lie on a common pitch circle, so that they define a zig-zag.

In a modification, adhesive fastening may be used, which enables the fastening holes to be omitted, and the strength of the blade to be improved, in a manner described below.

More precisely, the liner support disc with its liners 131, 132 is in this example part of a clutch friction wheel which comprises two coaxial parts mounted for movement of one with respect to the other against the action of circumferentially acting resilient means 5 and axially acting resilient means 20.

Such a friction wheel is described, for example, in the Application EP-A-0 579 554, and in U.S. Pat. No. 5,014,842, to which reference can be made.

In the present example, one of the parts comprises two guide rings 1, 2 together with the liner support disc, while the other coaxial part comprises a damper plate 4 which is secured to a hub 3 for rotation with the latter by seaming (not shown), or, in the present case, by means of loose coupling means which can be seen in particular in FIG. 3 of U.S. Pat. No. 5,014,842.

Accordingly, these means comprise trapezoidal teeth which are formed on the outer periphery of the hub 3 and on the inner periphery of the damper plate 4, with the said teeth meshing together and having a clearance between them.

Low stiffness springs, not shown, engage at each of their ends on cup members which are fitted in slots of the hub 3 and damper plate 4, so as to give elastic coupling between the said components.

It is possible to reverse the structures, with the liner support disc then being secured to the damper plate 4 which is movable in rotation with respect to the hub 3, while the guide rings are then fixed to the hub 3.

Similarly, the liner support disc may be fixed to the damper plate 4, which is itself secured to the hub 3, the clutch friction wheel then being of the rigid type.

In this example, the liner support disc is abutted in its central portion 16 to the guide ring 1, and is secured to the latter by means of spacers which extend, with a clearance, through apertures 7 formed in the damper plate 4.

These spacers 8 secure together the guide rings 1, 2 which are arranged on either side of the damper plate 4.

The resilient means 5 consist in this example of coil springs which are here mounted in pairs in windows formed in facing relationship with each other in the guide rings 1, 2 and in the damper plate 4 in a manner known per se.

The friction means 20 comprise a friction ring which is interposed axially between the damper plate 4 and the ring 1, together with a thrust ring which is mounted on the guide ring 2, for rotation with the latter, by means of axial lugs which are engaged in apertures formed in the said ring 2.

A spring bears on the ring 2, and biasses the thrust ring into contact with the damper plate 4.

The liner support disc is equipped with two annular friction liners 131, 132 which are mounted in back-to-back relationship on either side of the central portion 16.

These friction liners are in this example of the organic type, being circumferentially continuous and reinforced by glass fibres of KEVLAR, or otherwise.

In a clutch, the liners 131, 132 are normally gripped between the pressure and reaction plates (not shown) of the clutch, which are fixed to the crankshaft of the internal combustion engine of the motor vehicle for rotation with it, while the hub 3 is coupled, through its splined internal bore, to the input shaft of the gearbox for rotation with the latter.

During operation of the clutch to disengage the latter, the friction liners 131, 132 are released so that in the disengaged position of the clutch, the liners are not in contact with the said pressure and reaction plates.

When the clutch is re-engaged, the liners 131, 132 are gripped progressively and elastically between the said plates.

This progressive gripping action is due in the present case mainly to the tripod blades 672, and more particularly, it is due to their flexible peripheral support zones 422.

The said blades 672 are of tripod form, with three flat support zones, 422 and 423 respectively.

The flat central zone 423 is in contact with the friction liner 132 which is associated with the pressure plate, and serves for the fastening of the said liner 132. This zone 423 reduces in width towards the outer periphery of the liner support disc. It is thus wider at its inner periphery.

The zones 422 lie at the outer periphery of the blades 672, on either side of the central zone 423. They are generally triangular in shape and are joined to the zone 423 through oblique bent portions 421, which in this example are symmetrical with respect to the radial axis of symmetry of the blade 672. These bent portions 421 thus extend obliquely with respect to the said radial axis and provide an axial offset between the zones 422, 423.

The zones 422 and 423 are offset axially, while being parallel to each other. More precisely, the zones 422 are arranged to make contact with the friction liner 131 associated with the reaction plate of the clutch. In the present example they extend in the plane of the central portion 16.

The central zone 423 is joined to the central portion 16 through a tangentially orientated bent portion 480, or longitudinal bent portion, which in this example is at right angles to the radial axis of symmetry of the blade. The bent portion 480 extends, here, symmetrically with respect to the said radial axis of symmetry of the blade. This obliquely bent portion 480 constitutes the foot of the blade, and gives an axial offset of the zone 423 with respect to the central portion 16.

Thus, when the liners 131, 132 are compressed, the zones 422 deform axially. It will be noted that the width of the bent portions 480 are of large width and therefore very robust, and that the zone 423 has two internal zones which flank the foot 480. Cane shaped slots 24 separate the blades 672 from the tongues 671. These slots are open at the outer periphery of the liner support disc, and have a C-shaped closed inner end for their junction with the bent portions 480.

The blades 672 are long in the circumferential direction, and in this example they are separated from each other by an angle of 45°, so that here, an angle of 22° 30' exists between the axis of symmetry of a blade 672 and the axis of symmetry of a tongue 671, and therefore between two holes 19. A blade 672 is thus flanked in a regular manner by two tongues 671, with the holes 19 being spaced apart circumferentially at regular intervals.

The tongues 671 accordingly have, here, a short circumferential length, being flexible and long in the radial direction.

In accordance with the invention, a liner support disc of the type described above is characterised in that at least some of the said tongues 671 have, in a connecting bent portion 621, at least one supplementary support zone 622 which is offset axially towards the central zone 423 of the tripod blades.

Thus, when the liners 131, 132 are being compressed, the said zone 622 is adapted to make contact with the liner 132, so as thus to offer a reaction force. This zone 622 accordingly constitutes a stabilising zone, which in the present case extends in the plane of the central zone 423, due to the radially orientated oblique bent portion 621. In a modification, the zone 622 may be slightly behind the zone 423. Thus the liner 131 remains properly flat.

In FIGS. 1 to 4, the supplementary support zone is formed at the free end of the tongue 671, that is to say at the outer periphery of the latter. The tongue 671 is of tapered form, with its root zone that joins it to the central portion 16 being wider than its outer periphery constituted by the above mentioned support zone 622, the outer periphery of which lies on the same circumference as that of the blades 672.

Thus the tongue 671 has an integral main part 623 for supporting the liner 131 and for fastening of the latter by means of holes 19, a radial connecting bent portion 621, and the support zone 622. The depth of the bent portion 621 is greater than the depth of the support zone 622. These radially orientated tongues 671 are accordingly resilient and flexible. Their taper gives resilience to the surface 621, 622.

It will be noted that the free end 622, 621 of the tongue 671 is shortened in the circumferential direction, which enables further flexibility to be given to the surface 622, which extends circumferentially between two zones 422 at the outer periphery of the disc. This also enables the area of the peripheral zones 422 to be increased.

In this way, a liner support disc is obtained which has at its outer periphery large support zones which reduce seizing and juddering effects, because the friction liners 131, 132 remain in a plane which is properly parallel. The liner support disc, and therefore the clutch friction wheel, can thus rotate at high speed, while following the tendency of the pressure and reaction plates to adopt a conical form. Distribution of wear of the liners is increased even more.

It will be appreciated that the bent portions 480 and 621 give good stability to the liner support disc, which enables good contact of the friction liners with the pressure and reaction plates to be obtained, and this reduces wear in the friction liners.

In the present example, the support zone 622 is shallower than the peripheral support zones 422. The depth of the bent portion 621 and that of the zone 622 is generally equal to that of the oblique zone 422. In this connection, what is sought here is a supplementary application point and flexibility such that the zone 622 constitutes a stabilising zone.

In a modification, it is possible to modify the stiffness of the zone 622 in a simple way, by decreasing or increasing the length of the bent portion 621, in such a way that the outer periphery of the tongues can extend over a circumference having a smaller or greater diameter than that of the circumference of the outer periphery of the blades 672.

It will be appreciated that the good equilibrium of the clutch friction wheel, and good flatness of its friction liners, are due in particular to the regular spacing of the fastening holes 19 and to their position on the axis of symmetry of the tongues 671 and blades 672.

The simplicity of manufacture of this arrangement will also be noted, this being due to the radial displacement of the press tool that can be obtained, enabling discs to be made with blades and tongues of different depths.

In this example, in the position in which the clutch is engaged (with the liners 131, 132 gripped), a space exists between the two liners 131, 132 so that the blades 672 are not totally squeezed, and so that the said liners are permitted to adapt to the form of the pressure and reaction plates.

The present invention is of course not limited to the embodiment described. In particular, the tripod blades may have another shape, such as those described in the above mentioned document EP-A-0 579 554.

Figure 5:
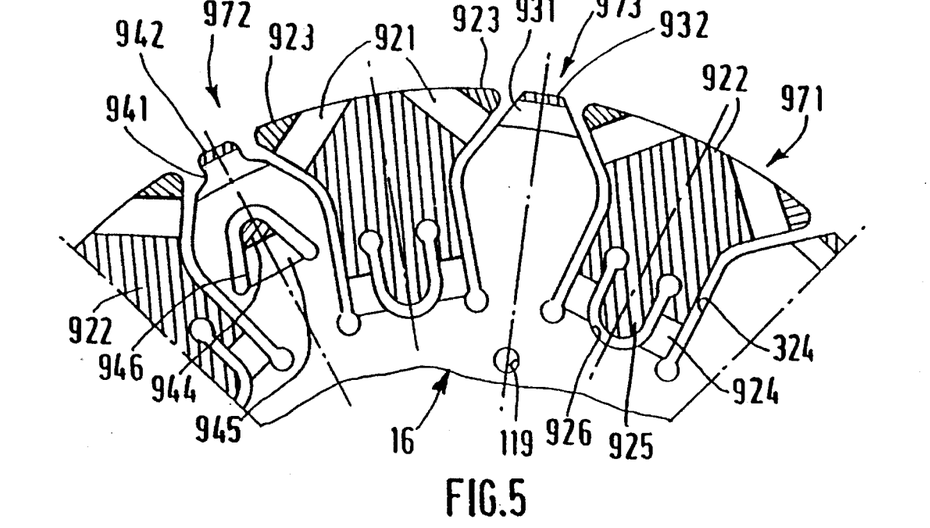
FIGS. 5 to 10, 12 are views similar to FIG. 4, showing further embodiments.

Thus in FIG. 5, the tripod blade 971 has a central support zone 922 which is of reduced width at its outer periphery, and which is offset axially with respect to the central portion 16, by virtue of the bent portions 921, oblique with respect to the radial axis of symmetry of the blade, and the longitudinal bent portion 924 at right angles to the said axis of symmetry.

The central zone 922 is extended radially inwardly in the middle, by a U-shaped central slot 926 which is formed in the longitudinal bent portion 924. This extension is generally in the form of a tongue in the form of a lug 925, having a root zone that joins it to the central zone 922 of reduced width, with the vertical ends of the slot 926 being open into circular holes.

The lug 925 is thus directed towards the axis of the assembly, and has a rounded free end.

The peripheral support zones 923 are generally in the plane of the portion 16. These zones 923 project circumferentially with respect to the central zone 922, in such a way that the blades 971 are generally T-shaped.

Advantage is taken of this shape to increase the circumferential width of the tongues in their middle radial zone. Thus, these tongues 972, 973 are, in their radially central part, wider than at their free ends and wider than in the zone by which they are joined to the portion 16.

In this example, the radial tongues 972 and 973 are of different configurations. These tongues are arranged in regular alternation in the circumferential direction with the blades 971. The free end of the tongue 972 is of reduced circumferential width, and has a supplementary support zone 942 of similar form to the support zone 922 joined to the main portion of the tongue through a connecting bent portion 941, which for good flexibility has a constant width at the level of the zone 942, offset axially towards the central zone of the support surface 922 of the blades 971. This bent portion 941 is widened at its base. In this example, the supplementary zone 942 is in the plane of the zone 922 of the blade 971. The said zone 942 can of course be situated slightly back, with respect to the zone 922.

The tongue 973 has at its free end a zone 932 which is joined through a bent portion 931 to the main zone of the tongue 973.

The bent portion 931 and the zone 932, which are here in the plane of the central zone 922, are trapezoidal in shape. The bent portions 941 and 931, of variable width, have a smaller depth than the bent portion 621 in FIG. 2.

As will have been understood, because of the two sets of tongues, it is possible to provide an axial offset between the zones 942 and the zone 932, in such a way that the liners are well supported during engagement of the clutch.

In this example, the central portion 16 has fastening holes 119 for the fastening of the central portion 16 to the guide ring 1, or to the damper plate 4 as the case may be.

It will be noted that the slot 926 is formed centrally in the bent portion 924, which is thus divided into two, and this improves the progressive gripping of the blade 971. This bent portion has good mechanical strength in spite of the slot.

It will be noted that the slots 324 that separate the radial tongues 972, 973 from the blades 971 have a non-straight shape due to the central widening of the said tongues.

In this example, the liners 131 and 132 are secured directly by adhesion on the main part of the tongues 972, 973 and on the central zones 922 of the blades 971. It will be noted that the extension 925 is favourable to adhesion.

By virtue of all these arrangements, it is possible to reduce the thickness of the liners 131, 132.

Thus, the said liners 131, 132 have just the required thickness, because there is no need to provide any thickened portion for the rivets 47 as in the embodiment of FIGS. 1 to 4.

Thus the inertia of the clutch friction wheel is reduced, which is beneficial to conservation, during disengagement of the clutch, of the gears of the gearbox on the input shaft of which the hub 3 is mounted.

In addition, the blades and the tongues are stiffened because they do not have holes for accommodating rivets.

Accordingly, it is possible to benefit from this so as to create, for example in the tongue 972, a supplementary support zone 944 which is offset axially towards the zone 922 by virtue of a bent portion 945 which joins the said zone 944 to the main part of the tongue 972 in the plane of the portion 16.

The provision of this supplementary zone is obtained by virtue of a slot 946, which is generally V-shaped and which is directed radially inwardly by contrast with the slot 926.

Thus, a tongue or lug 944, 945 is formed which is directed radially outwardly, extending symmetrically with respect to the radial axis of symmetry of the tongue 972.

The provision of the supplementary support zone 925 does of course also enable a supplementary hole to be provided for the fastening of the liner 132 by riveting.

Figure 6:
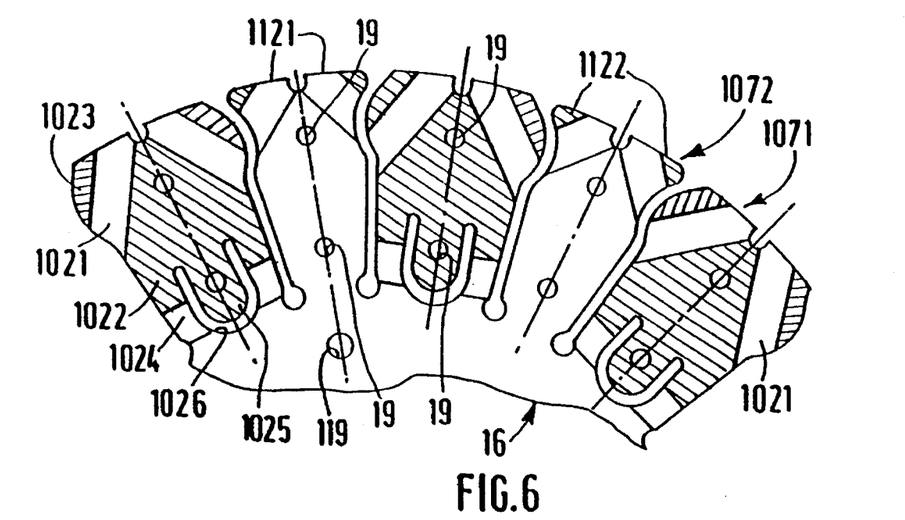

Thus, in FIG. 6, each tongue 1072 and each tripod blade 1071 has two holes 19 through which pass the fastening members for the liners 131, 132.

These holes are radially aligned on the radial axis of symmetry of the radial tongues 1072 and blades 1071.

The tongue 772 is extended radially beyond its longitudinal bent portion, towards the axis of the assembly so that it can be fastened to the guide ring, with the aid of holes 229 through which fastening members pass.

Figures 7, 8, 9:
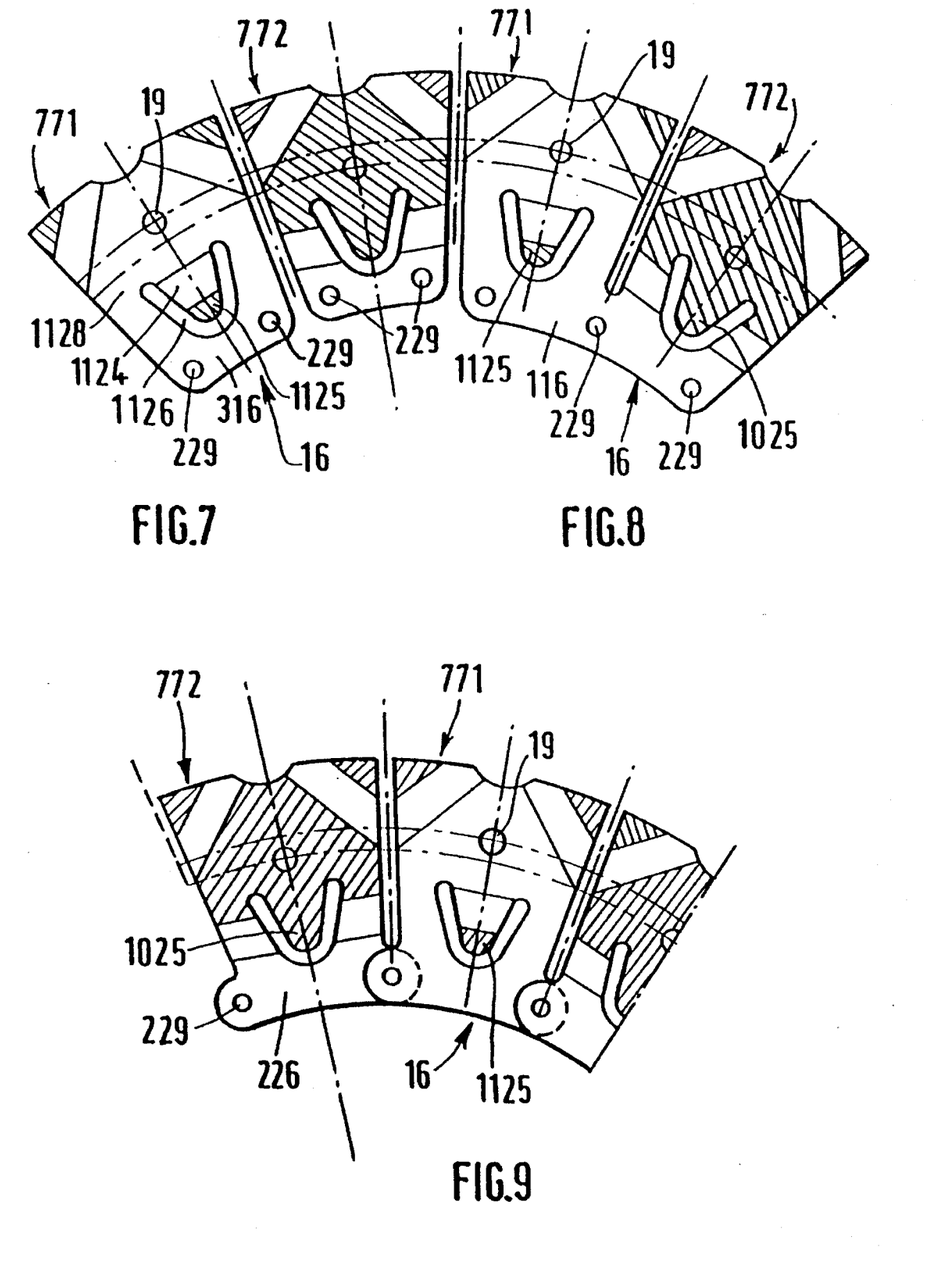

With reference to FIG. 8, the tongue 771 and blade 772 can of course be joined together at their base.

In that case, each blade 771 is integral with an integral strip 116, which is generally in the form of an angular sector.

The strip 116 joins one blade 771 to one tongue 772, and has three fastening holes 229 for securing it to the guide ring 1 or damper plate 4, in this case by riveting.

In FIGS. 7 and 8, the blades 772 and the tongues 771 are mirror images of each other, since their central zone has a generally V-shaped lug 1025, 1124, 1125 directed towards the axis of the assembly.

The lug 1025 is formed in the longitudinal bent portion of the tongue 772 as explained above.

With reference to FIG. 9, it is of course possible to divide the central portion into strips 226 with ears at each of their circumferential ends. The ears are provided with holes 229, and overlap as between a tongue and a consecutive blade 772.

One of the holes 19 is located in the zone of the extension 1025 of the central zone delimited by a U-shaped slot 1026, which is formed centrally in the longitudinal bent portion 1024 of the blade 1071. The extension 1025, in the form of a tongue or lug, is in the plane of the central support zone 1022 of the blade 1071, with the zone 1022 being offset axially with respect to the central zone 16, by virtue of the bent portion 1024 and the bent portions 1021, oblique with respect to the radial axis of symmetry of the blade 1071.

The bent portions 1021 are joined to the peripheral support zones 1023 which are generally parallel to the bent portions 1021.

The zones 1023 are generally in the plane of the zone 16.

The shape of the tongues 1072 is generally similar to that of the blades 1071, the only difference being that their main part is in the same plane as the central zone 16.

The radial tongues 1072 thus have at their outer periphery two supplementary peripheral support zones 1122, which lie generally in the same plane as the central zone 1022 of the blades 1071.

These zones 1122 are joined through bent portions 1121, which are oblique with respect to the radial axis of symmetry of the tongue 1072, to the main zone of the said tongue.

In this embodiment, the blades 1071 are widened at their outer periphery, and the tongues 1072 are widened circumferentially at their outer periphery.

The tongues and the tripod blades can of course be separate from each other, being attached for example by holes 229 to the guide ring 1 or damper plate 4.

Thus in FIG. 7, the tripod blades 772 are in circumferential alternation with the radial tongues 771, having a shape similar to that of the blades 772 as shown in FIG. 6.

In this way, the inner periphery 316 of the tongue 771 has two holes 229 through which fastening members such as rivets pass for securing to the guide ring 1 for example.

In this embodiment, the tongue 771 has a supplementary support zone 1125 in its central part.

This zone 1125 is in the same plane as the central zone of the blade 772, and is joined through a bent portion 1124 to the main portion 1128 of the tongue 771.

All of this is obtained by virtue of the slot 1126 which is generally V-shaped.

The bent portion 1124 with the tapered support zone 1125 generally constitutes a tongue or lug which is directed towards the axis of the assembly, by contrast with the embodiment of FIG. 5.

The strips 226 are secured in this embodiment to the guide ring 1, by riveting through the holes 229.

Figure 10:
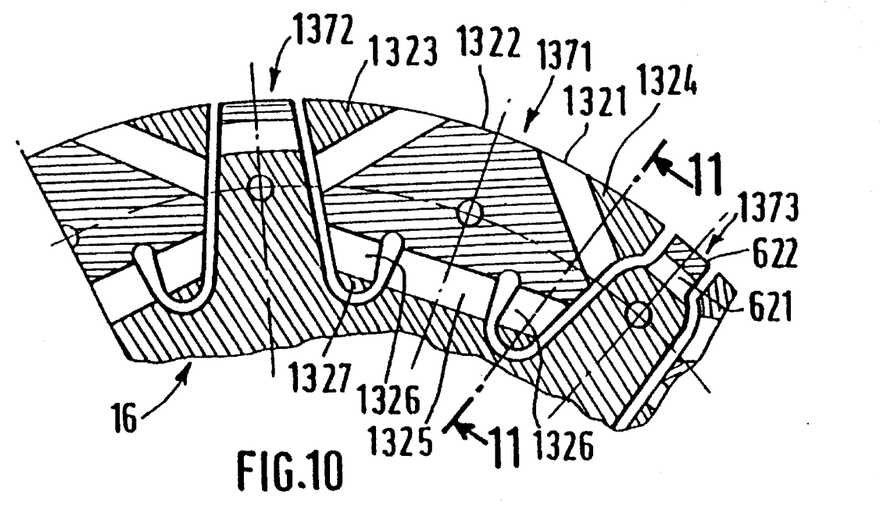
Figure 11:
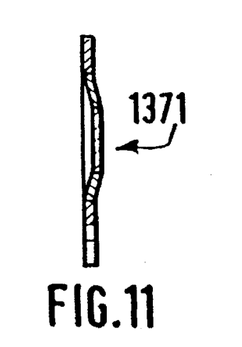
FIG. 11 is a view in cross section taken on the line 11,11 in FIG. 10.

With reference to FIGS. 10 and 11, the central zone 1322 of the blade 1371, having oblique bent portions 1321, a longitudinal bent portion 1325, and two peripheral support zones 1322 and 1324, may carry two supplementary support zones 1327 extending in the same plane as the main portion of the radial tongues 1372, 1373.

These zones 1327 flank the bent portion 1325, and are joined through longitudinal bent portions 1326 to the central zone 1322.

Thus, two tongues or lugs 1326, 1327 are formed, these being directed towards the axis of the assembly and lying on either side of the longitudinal bent portion 1325.

It will be noted that the tongues 1327 and 1373 are separate from each other, the tongue 1373, the shape of which is similar to the tongue 671 in FIG. 2, being reduced in width at its outer periphery, in such a way that the tripod blade 1371 is asymmetrical, the peripheral support zone 1324 then having a larger support surface than the other peripheral support zone adjacent to the tongue 1372.

Figure 12:
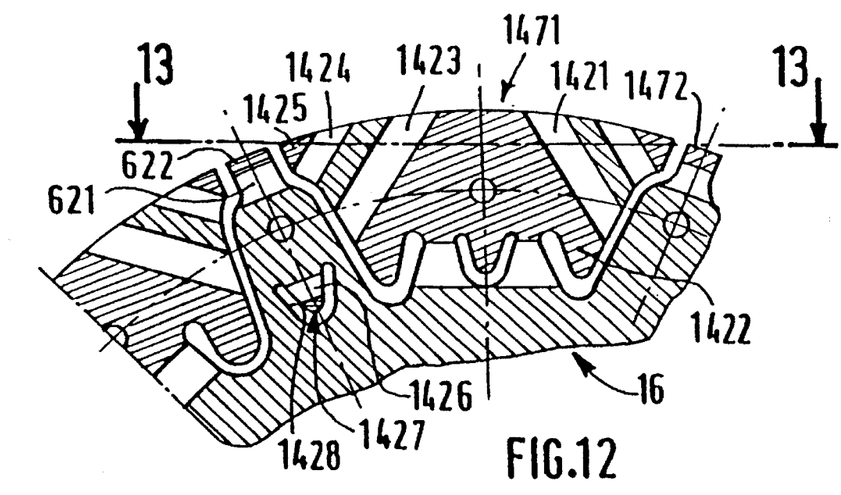
Figure 13:
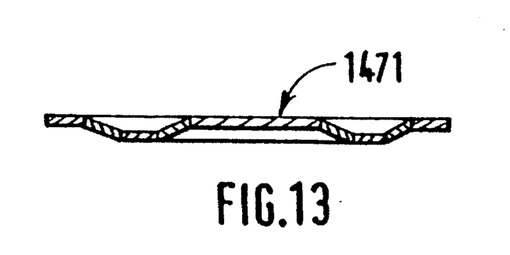
FIG. 13 is a view in cross section taken on the line 13,13 in FIG. 12.

With reference to FIGS. 12 and 13, it is of course possible to provide supplementary support zones 1425 in the The friction liners 131, 132 may be divided. In a modification, each liner may include a continuous support crown in which openings are formed for securing friction pads in the manner described in the above mentioned document EP-A-0 579 554.

The feet of the blades may be constituted not only by the tangential bent portions 480, so that an end portion of the feet joins the bent portions to the central portion of the friction wheel.

As can be seen in broken lines in FIG. 2, the bent portions 621 and the zones 622 are not necessarily symmetrical, and one tongue may alternate with another asymmetrically.

According to the particular application, it is of course possible to omit the support zones in the outer periphery of the radial tongues. For example in FIG. 5, it is possible to omit the bent portion 941 and the zone 942, and to retain the zone 944 and the slot 946.

In FIG. 12, the zone 622 and the bent portion 621 may be omitted, and the zone 1427 retained. It is also possible to provide two pressed-out openings directed in opposite radial directions and bounding a connecting bent portion that carries a supplementary support zone.

All combinations are possible. blades 1471, in the peripheral support zones of the said blade.

The support zones 1425 extend in the same plane as the central zone 1422. More precisely, the central zone 1422 is joined through an oblique bent portion 1421 to a peripheral support zone 1423 in the same plane as the main portion of the tongue 1472.

This zone 1423 is joined through a bent portion 1424, which is oblique with respect to the radial axis of symmetry of the blade 1471, to the supplementary support zone 1424. The said zone 1425 is in the same plane as the supplementary zone 622 of the tongue 1472.

This tongue 1472 also has, as in FIGS. 7 to 9, a supplementary support zone 1427 which is joined through a bent portion 1426 to the main portion of the tongue 671.

All of this is defined by a generally V-shaped slot 1428. Thus the zone 1427 is in the same plane as the central zone 1422.

By virtue of all of these supplementary zones, good stability is obtained for the friction liners, and this is favourable to a reduction in wear.

In FIGS. 7 to 9, it is of course possible to secure the friction liners 131, 132 adhesively to the tongues and to the blades 771, 772.

It will be appreciated that in FIGS. 7 to 9, the three supplementary support zones, namely the portion 1125 and the two peripheral support zones of the tongue 771, are carefully spaced apart in a triangular manner which is highly favourable to stability and reduction in wear of the liners 131, 132.

The oblique bent portions that join the peripheral support zones to the central zone may of course be arranged asymmetrically with respect to the radial axis of symmetry of the blade. The same is true for the central zone.

The supplementary support zones are not necessarily arranged on the radial axis of symmetry of the tongue. A slight offset can exist.

It is of course possible to replace, for example, the lugs 1025 of the blade 772 by the lugs 1125, 1124 in FIG. 7, so as to form a supplementary engagement zone which is offset towards the tongue 771.

We claim:

1. A liner support disc adapted to constitute a clutch friction wheel, comprising a central portion (16) and a peripheral portion divided into radial blades (672) alternating in the circumferential direction with a series of radial tongues (671) in the same plane as the central portion (16) of the liner support disc, in which the blades (672) have, joined by bent portions (421), a central support zone (423) for fastening a first friction liner (132) and two peripheral support zones (422) on either side of said central support zone (423), said peripheral zones (422) being parallel and offset axially with respect to said central zones (423), characterized in that at least some of said tongues (671) have a main part in the same plane as the central portion for fastening a second friction liner (131), at least one supplementary support zone (622) offset axially toward the central zone of the blades (672) by virtue of a connecting bent portion (621) for engagement against the second friction liner.

2. A liner support disc according to claim 1, characterized in that the supplementary support zone (622) is formed at the free end of the tongue (671).

3. A liner support disc according to claim 2, characterized in that the tongues (671) have a free end (622, 621) which is shortened in the circumferential direction.

4. A liner support disc according to claim 2, characterized in that the tongues have a shape in which they are tapered towards their outer periphery, so that the root zone in which they are joined to the central portion (16) of the liner support disc is increased.

5. A liner support disc according to claim 4, characterized in that the radial tongues (671) are separated from the blades (672) by cane-shaped slots (24).

6. A liner support disc according to claim 2, characterized in that said supplementary support zone (622) has a height which is smaller than that of said peripheral zones (422) and smaller than that of its connecting bent portion (621).

7. A liner support disc according to claim 1, characterized in that said support zone (944, 1125, 1427) is defined in the main portion of said tongue by virtue of the slot (46, 1126, 1428).

8. A liner support disc according to claim 7, characterized in that said slot defines a lug formed by said supplementary support zone and by its bent portion that joins it to the main portion of the tongue.

9. A liner support disc according to claim 7, characterized in that said tongue also has at its free end a support zone (622) which is offset axially towards the support zone of the blades by virtue of a connecting bent portion (621).

10. A liner support disc according to claim 1, characterized in that the tongue (1072) has at its outer periphery two supplementary support zones (1121) which are joined to the main portion of the tongue (1072) by two bent portions (1121), which are oblique with respect a plane of symmetry of the tongue.

11. A liner support disc according to claim 1, characterized in that friction liners are adhesively secured on the radial blades and tongues.

* * * * *